United States Patent
Warmerdam

(10) Patent No.: US 6,808,051 B2
(45) Date of Patent: Oct. 26, 2004

(54) SYSTEM AND METHOD FOR ACTIVE VIBRATION ISOLATION AND ACTIVE VIBRATION CANCELLATION

(75) Inventor: Thomas P. H. Warmerdam, Veldhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/367,511

(22) Filed: Feb. 14, 2003

(65) Prior Publication Data

US 2004/0060792 A1 Apr. 1, 2004

Related U.S. Application Data

(60) Provisional application No. 60/414,375, filed on Sep. 27, 2002.

(51) Int. Cl.$^7$ .................................................. F16F 7/10
(52) U.S. Cl. .................. 188/380; 188/266.1; 267/64.28
(58) Field of Search ................................ 188/378–380, 188/266.1; 267/136, 64.28; 248/550, 631, 635; 318/568.17, 611, 632, 652, 623

(56) References Cited

U.S. PATENT DOCUMENTS

| | | | | |
|---|---|---|---|---|
| 5,060,519 A | * | 10/1991 | Chojitani et al. | 73/662 |
| 5,568,032 A | * | 10/1996 | Wakui | 318/632 |
| 5,812,420 A | * | 9/1998 | Takahashi | 700/280 |
| 6,170,622 B1 | * | 1/2001 | Wakui et al. | 188/378 |
| 6,286,644 B1 | * | 9/2001 | Wakui | 188/378 |

* cited by examiner

Primary Examiner—Pam Rodriguez
(74) Attorney, Agent, or Firm—Kevin Fortin

(57) ABSTRACT

The invention relates to a system and method for vibration isolation and cancellation, especially but not exclusively suited for a damper in wafer-chip production equipment. Active vibration isolation and cancellation technology (or air mount technology) for chip production equipment needs to become more effective with the advancement of the production of chips that require ever-smaller features. Typically, actuators and sensors in an active isolation/cancellation system are frequently used but not optimized in their technology. By integrating the actuators and the sensors together certain performance limitations become negligible and can be discarded. The resulting damper can be of an absolute or of a relative damper type. The performance of a vibration isolation and cancellation system and its limitations can be described using gain and phase relations from the control theory. A damper that uses the proposed system is of a so-called absolute damper type.

38 Claims, 19 Drawing Sheets

SYSTEM AND METHOD FOR ACTIVE VIBRATION ISOLATION AND ACTIVE VIBRATION CANCELLATION

This application claims the benefit of Provisional application No. 60/414,375 filed Sep. 27, 2002.

FIELD OF THE INVENTION

The invention relates to a vibration isolation and cancellation system and method, especially but not exclusively suited for high precision wafer-chip production and inspection equipment.

BACKGROUND ART

Products that make use of active vibration isolation and cancellation technology are available commercially, but their degree of effectiveness leaves room for improvement. Active vibration isolation and cancellation technology (also known as air mount technology) for IC production and inspection equipment needs to become more effective with the advancement of the production of chips that require ever-smaller features. Typically, actuators and sensors in an active isolation/cancellation system are not integrated. For instance, U.S. Pat. No. 6,286,644 to Wakui discloses and describes an active vibration isolator wherein in FIG. 7 sensors 'P0' and air spring actuators 'AS' are separate elements.

SUMMARY OF THE INVENTION

It is an object of the present invention to provide an active vibration isolation/cancellation system that integrates an actuator and a sensor. The system provides a much improved vibration cancellation behavior. The system is useful for, amongst others, virtual all types of high precision production equipment, e.g., in an air-mount for chip production equipment, high precision microscopes and other high precision equipment. The application of the system, for instance, reduces an important barrier in the quest for chips with smaller features. The invention is based on a notion that an actuator and a sensor in an active vibration isolation/cancellation system can be integrated in such a way that many known performance limits (such as described by gain and phase relations from well known control theory) are removed to a degree where they are no longer a performance limitation.

It is another object of the invention to apply the proposed active vibration isolation/cancellation system in an absolute damper. By combining damper technology with air mount technology, a much improved air mount performance is achieved. The absolute type of (motion) damper of the invention typically but not exclusively comprises two parts that are displaceable relative to one another, at least in the direction to be damped. The first part of this type of damper, that may comprise an actuator coil and a complete sensor assembly, is connected to a first body (typically a mass to be damped). In case the sensor of this type of sensor is of a magnet and coil type, one part, e.g. the sensor-coil, is connected to the first body and the other part, e.g., the sensor-magnet of the invention, may be loosely connected to the first body with respect to motion that needs to be damped. The inventor proposes to attach the sensor-magnet to a reference mass that is supposedly not negatively affected by vibrations from other bodies. The reference mass can be realized by a floating mass (loosely connected to the first body). This floating mass acts in an absolute damper as an absolute reference. The second part of this type of damper, that may comprise an actuator magnet, is stiffly connected to a second body (typically a floor or reference without motion). The second body is only required with respect to the operation of the damper for providing a reaction force as reaction of the action force on the first body by the actuator. It is also possible to use an additional body in which to store the reaction forces. This will give at low frequencies a lower level of performance, but can be preferable in certain cases. In the descriptions above and below, the locations of coils and magnets could be exchanged without affecting the general idea of this invention. Whether or not to swap the locations of the coils and magnets is a discussion that depends on many factors and might change from one implementation to another. Typically however, it is preferred to mount the component with the lowest inertia to the body whose motion is to be damped or controlled Various aspects of the invention are however also applicable for a relative damper and therefore not limited to the absolute damper. The relative type of (motion) damper typically comprises two parts that are displaceable relative to one another, at least in the direction to be damped. The first part of this type of damper, that may comprise an actuator coil and a sensor coil, is stiffly connected to a first body. The second part of this type of damper, that may comprise an actuator magnet and a sensor magnet, is stiffly connected to a second body.

In a preferred embodiment a Lorenz type coil as a sensor and another one as a actuator is used due to their close-to-ideal performance. By using a specific coil design a potential cross talk between the coils of the sensor and the actuator can be minimized to a level where it can be discarded. A damper provides an opposing force to velocity. Since Lorenz type of coils (also called voice coils) can sense velocities and can provide forces, they are appealing candidates as sensors and actuators. In practical implementations (such as in an active air mount) they are, for that and other reasons, frequently used. Other types of sensors and actuators can also be used. They might however require signal conditioning or other operations to make them applicable. An example of another type of sensor is a laser interferometer.

An important aspect of the invention lies in the observation that the sensor and the actuator of are preferably mounted in such a way that the combination (that is part of the damper) possesses certain relevant properties. One of the relevant properties is that the travel time for a mechanical signal caused by the actuator to the sensor is small. After the actuator induces a mechanical movement the sensor measures the mechanical movement. The sensor and the actuator combination of the invention have an acoustic delay, in a preferred embodiment, of far less than one millisecond (typically faster than 40 microseconds). Also the mass in the direct path between the sensor and actuator should be minimized while the stiffness should be maximized. All these prescriptions can be achieved by placing the sensor and actuator substantially close to each other. Having a limited travel time for the mechanical signal, without any substantial cross talk (between the actuator and the sensor) allows the damper to have a high gain feedback control loop without having any instability. Moreover the damper of the invention preferably, although not exclusively, has an electrical delay (that is between the sensor and the actuator) of less than one microsecond. That means that on detection by the sensor of a signal caused by a mechanical movement, a quick reaction is possible (that is commanding the actuator to generate a force).

It is yet another object of the invention to minimize crosstalk and interferences, in particular between the actuator and the sensor. The inventor found that crosstalk is reduced, amongst others, by using a magnetical type of actuator and a non-magnetical type of sensor. An example of a non-magnetical type of sensor is an optical one. An additional novel manner to achieve a minimum of unwanted cross talk is to place an actuator-coil and a sensor-coil perpendicular relative to each other. By doing so a magnetical field induced by the actuator-coil of the actuator will cause a minimum of induced current in a sensor-coil The sensor coil does not generate a field, so the cross talk concerns only in one way.

By having two instead of one sensor coil, and by using magnets of opposite polarityin the reference body, two sensors are made that give opposite signals when a motion is present, but they give an equal signal when an electrical or magnetical disturbance is present. By subtracting the two sensor signals, the measurement of the motion is amplified, and all common disturbances are cancelled. An equally effective method is to use identical magnet arrangements and an opposite coil winding direction.

The inventor found another way to reduce unwanted cross talk by using a shielding between the actuator and the sensor. When applying a shielding comprising an electrical conductor (e.g., copper shielding), a shielding is achieved for EM waves. The latter type of shielding is also beneficial for reducing negative effects caused by external EM sources (e.g. caused by 50/60 Hz mains supply wiring). A shielding should be applied between the sensor and the actuator and or the external EM source. For instance, the sensor and or actuator can be packed with a copper foil. In order to reduce unwanted magnetical cross talk a magnetical shielding needs to be applied. This can be achieved by, e.g., surrounding the sensor coil(s) with so-called $\mu$-metal.

The inventor also found that when covering the damper with a cover against noise the performance of the damper is further increased. That is because the inventor found that acoustical waves act as current inducing disturbances on the coil. The inventor found that it is advantageous to provide an acoustical shield in the absolute type of damper, in particular around the floating reference mass. This shield should have no contact with the reference mass. In a typical but not exclusive embodiment, the sensor-magnet is to be loosely connected to the mass to be damped. When the actuator coil is fed by an ideal current source, a movement of the second body cannot induce a current in the actuator coil. The second body (to which the actuator magnet is mounted) is only present to provide a reaction force of an action force of the actuator (otherwise no movement could be induced to the mass to be damped). When the current source is designed to be close to ideal source, little to no disturbance is expected from a movement of the second body (except for wild movements of the second body whereby collisions occur, in which case there is a construction error).

In a preferred embodiment both the sensor and the actuator are mounted to a body that needs damping but not to each other (e.g., in the prior art both the sensor and the actuator are mounted in an assembly and this assembly is mounted to the object to be damped). The disadvantage of this is that the performance becomes dependent on how well the assembly is mounted to the body to be damped. Even in the best of cases this is always limited. By giving the sensor and the actuator their own interfaces, this dependency is removed. By mounting the sensor and the actuator parallel (instead of serially) with respect to each other, the object to be damped is free of effects caused by deformations in the damper (e.g., by a limited stiffness) since the sensor will only measure movements of the object, without averse affects of deformations in the damper due to actuator forces.

In another preferred embodiment both the sensor's line of action (or a combination of a multiple sensors) as well as that of the actuator are in the same point and the same direction (this is not the case in the prior art). This embodiment improves the damping of the body since a damping action is performed on the exact location where a disturbance has been measured. The damping characteristics are improved even more when a disturbance can be predicted and an anticipated compensation signal can be fed to a compensation means (e.g., electrical circuitry connected to the actuator) of the damper.

Additional advantages and novel features will be set forth in the description which follows, and in part may become apparent to those skilled in the art upon examination of the following, or may be learned by practice of the invention.

BRIEF DESCRIPTION OF THE DRAWINGS

The invention is explained in further details, by way of examples, and with reference to the accompanying drawings wherein.

DETAILED EMBODIMENTS

Limitations of the performance of an active isolation/cancellation system can be described using gain and phase relations from the control theory.

Figure 1:
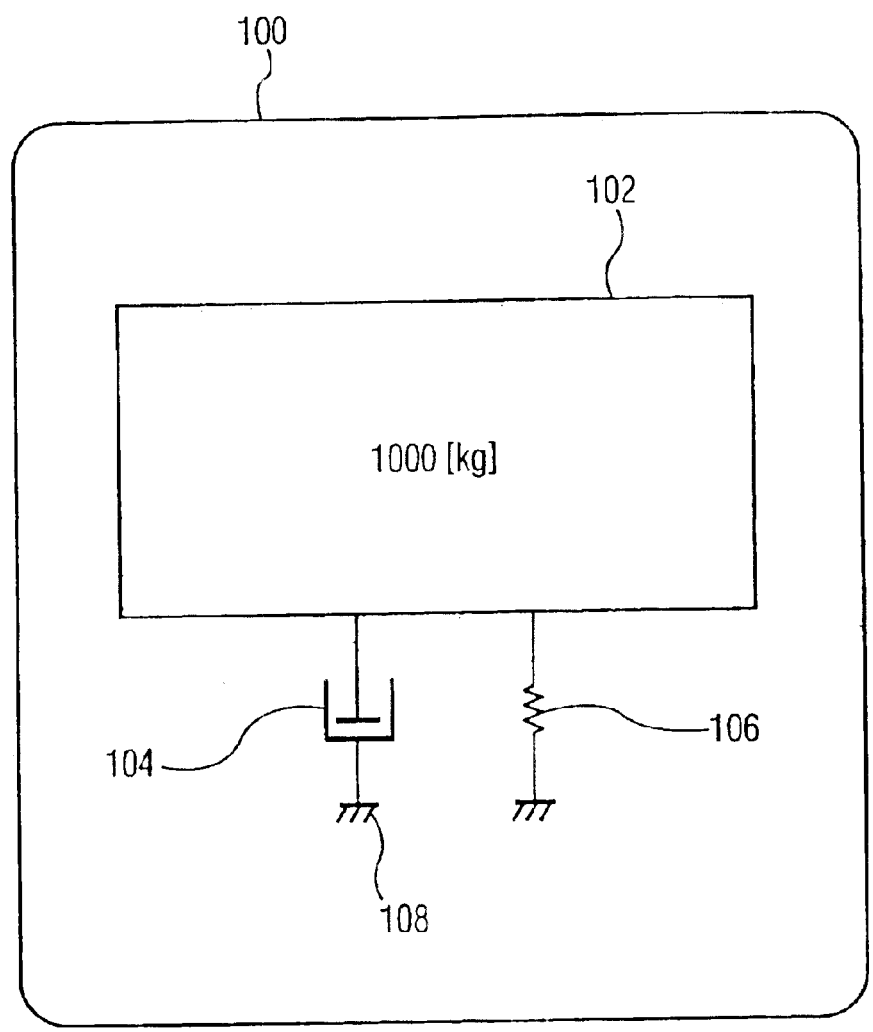
FIG. 1 shows a system of a basic damper principle.
Figure 2A:
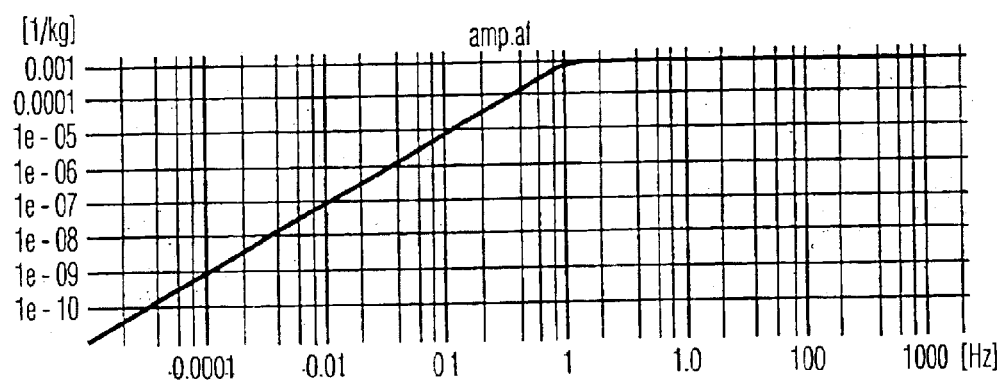
FIGS. 2A–B are diagrams showing an air mount performance of one on the market.
Figure 2B:
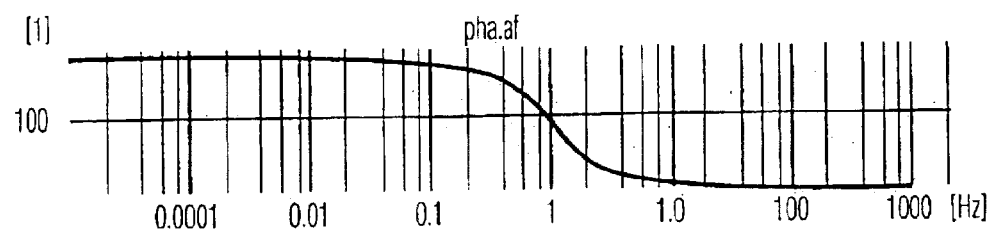

FIG. 1 shows a diagram of a system 100 that illustrates a basic damper principle. Diagram 100 comprises a main plate 102 of about of 1000 [kg], a floor damper 104, a stiffness (also called floor spring) 106 and a floor 108. The main plate 102 and the floor 108 are connected with each other via the stiffness 106 and damper 104. The stiffness 106 is o stiff that it gives a resonance frequency of 1 [Hz]. The damper 104 value is typically such that it makes the whole system 100 critically damped. The force sensitivity of such a system is shown in FIG. 2.

At low frequencies a force of 1 [N] will give vibrations of less than 1 [mm/s2]. Above 1 [Hz], the vibration amplitudes will be a constant 1 [mm/s2]. This is reasonable air mount performance if one looks at what is available in the market. Yet many companies complain that this is not good enough. Disturbances are often more than 1 [N] and lithographic machines and electron optical machines need a lower vibration level than what is offered here.

Figure 3A:
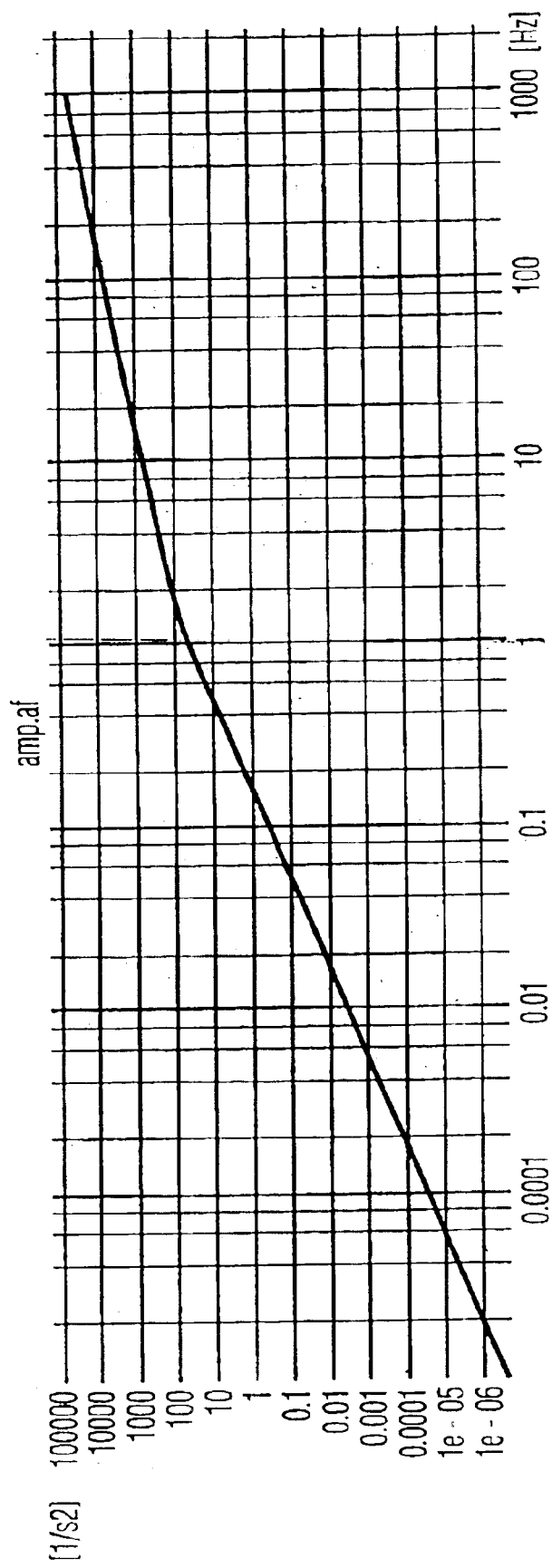
FIGS. 3A–B are diagrams showing floor vibrations that are affecting a main plate.
Figure 3B:
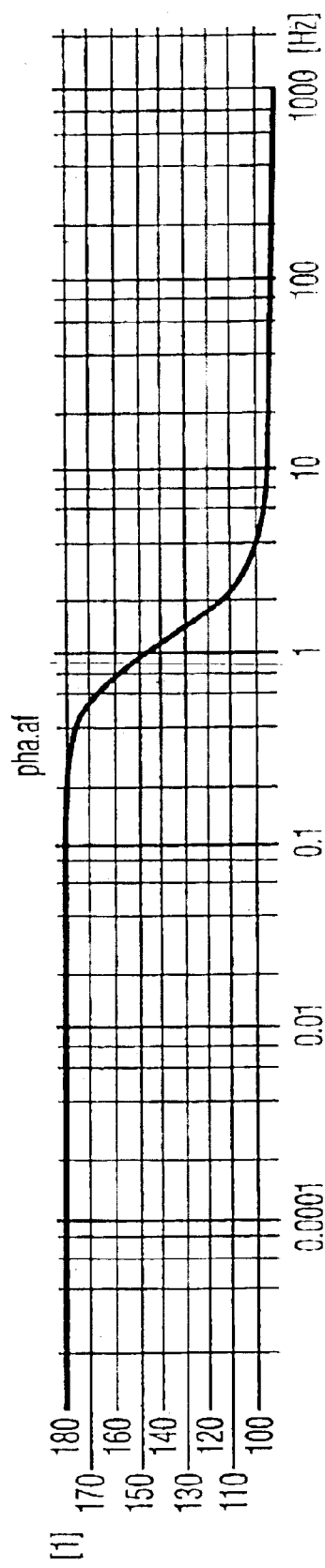

A dominant error source of vibrations is the floor. The floor vibrations are affecting the main plate via the floor damper and the floor spring. This effect is show in FIG. 3. A 10 micrometer floor vibration at 10 [Hz] will give rise to a 10e–6[m]*500 [1/s2]=5[mm/s2] main plate vibration.

Figure 4:
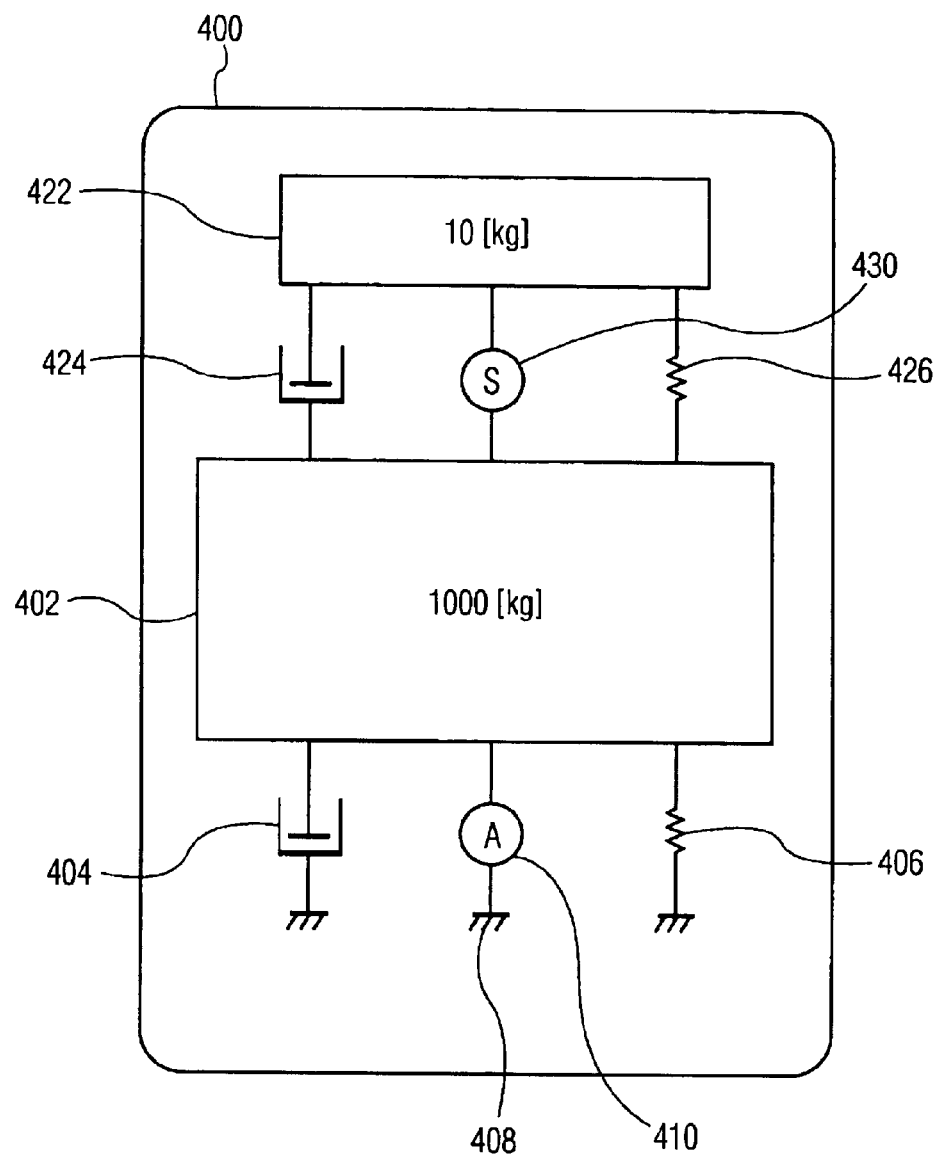
FIG. 4 shows a diagram of a system that shows an improved air mount.

FIG. 4 shows a diagram of a system 400 that includes an improved air mount. It involves the addition of a sensor 430 from the main plate 402 to a reference mass 422, and an actuator 410 between the main plate 402 and a floor 408. Other parts of the system comprise a floor damper 404, stiffness 406, another damper 424 and another stiffness 426. If the sensor 430 senses motion, then the actuator 410 is commanded such that the motion is reduced. This is, in effect, an extra damper. Reference mass 422 effectively functions as a means to indicate when the main-plate moves to the sensor and thereby inducing a signal in the sensor.

Figure 5A:
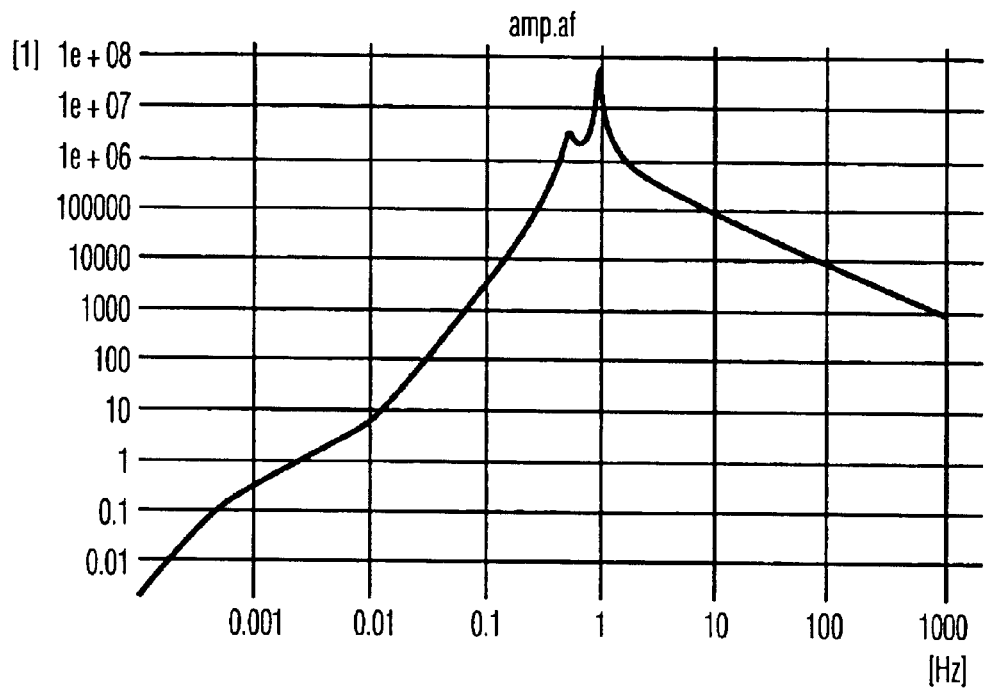
FIGS. 5A–C are diagrams of an open loop performance of a improved system with a controller.
Figure 5B:
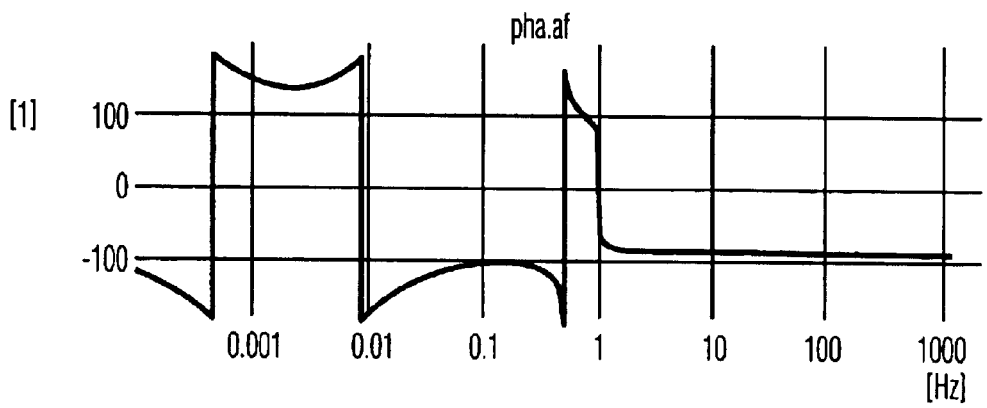
Figure 5C:
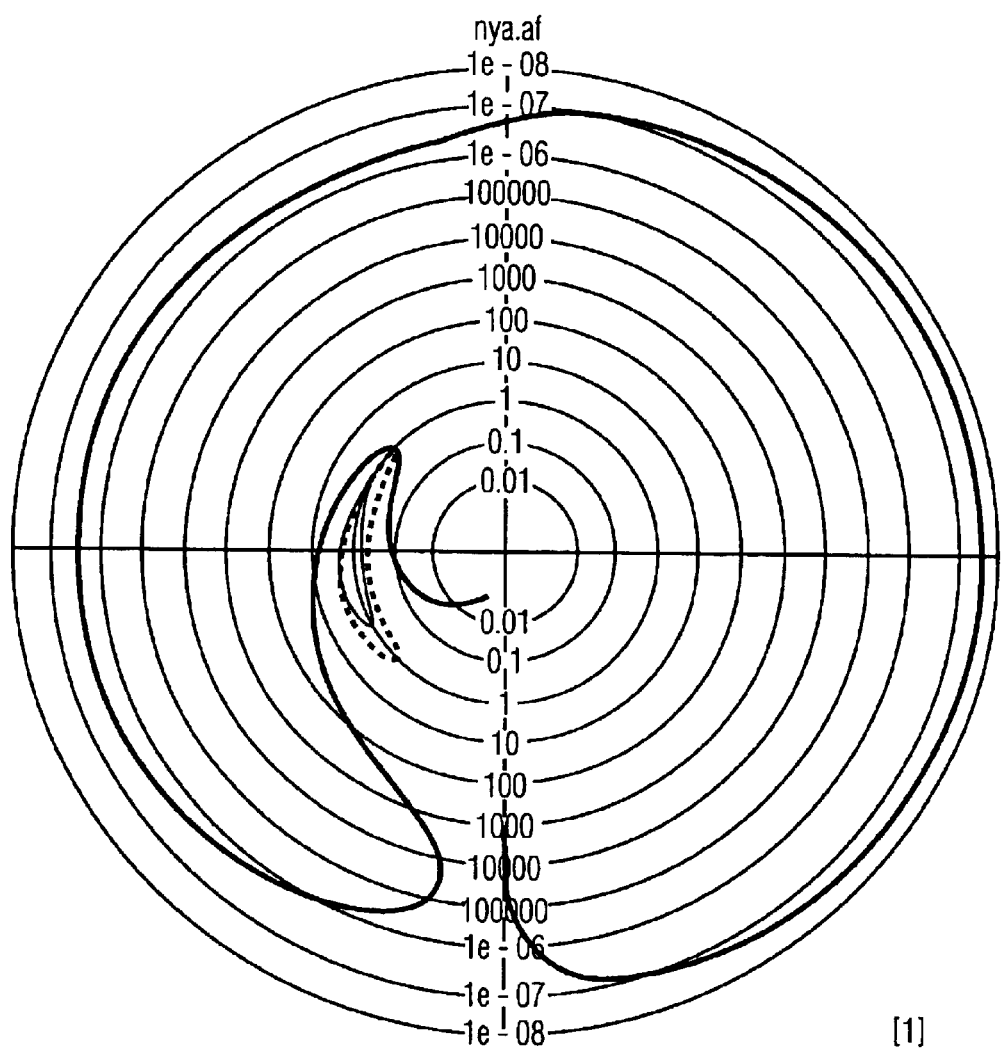

From previous electromechanical damper experience it is known that a performance of 1e6 [Ns/m] can be made. In a typical but not exclusive embodiment the reference mass is supported at 0.5 [Hz]. This electronic addition needs a controller to allow us to make a stable system with high gains. A possible open loop performance of the new system with controller is given in FIG. 5. This is by not the only way to make it work; it just serves as an example. Since the load is a 4th order system (actuator is attached to the first mass, sensor to the second), a total of 360 degrees phase shift should be expected. A low frequencies the stiffness dominates, combined with a derivative action of the velocity sensor gives a +3 slope at low frequencies with +270 degrees phase shift. Then two points of resonance can be seen, ending in a –1 slope with a phase of –90 degrees. By adding a double local lag-lead filter at the +slope, a stable system is obtained which will allow a substantial gain. Just to show off, in FIG. 5 a peak gain of 5e7 has been used. In the right hand side a polar plot is made of the open loop transfer function. The Nyquist –1 point is encircled with a red circle with radius 0.5, which indicates the minimal stability margin. The green circle has a radius of √0.5, which is a good distance for a damped time domain response.

Figure 6A:
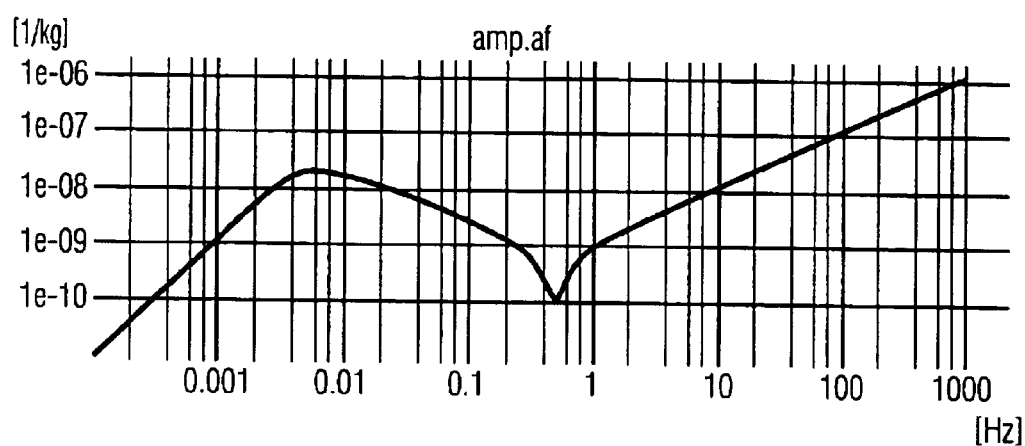
FIGS. 6A–B are diagrams that illustrate a performance improvement an improved air mount system.
Figure 6B:
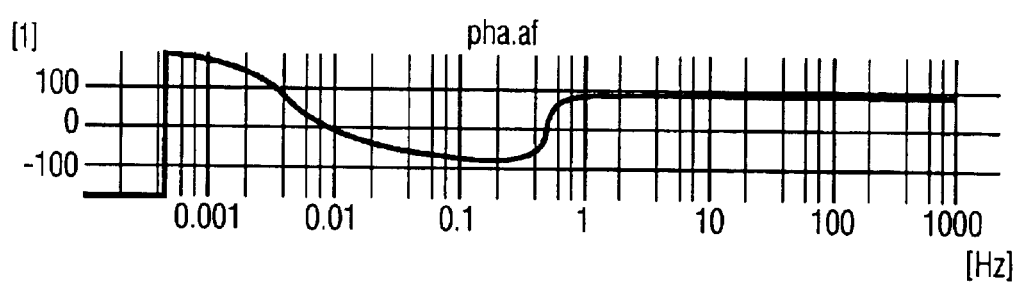

The performance improvement on the air mount system is substantial (see FIG. 6). At low frequencies the start is the same. This is because here the behavior is dominated by the stiffness of the floor spring, which has been kept identical. But the traditional damper started to improve at 1 [Hz], while the new damper does that at 0.003 [Hz]. At 1 [Hz], the vibration level is 1 [nm/s2] (improvement 1e6 times). The performance remains significantly better up to and beyond 1000 [Hz]. At 1000 [Hz], the improvement is still a factor of 1000.

Figure 7A:
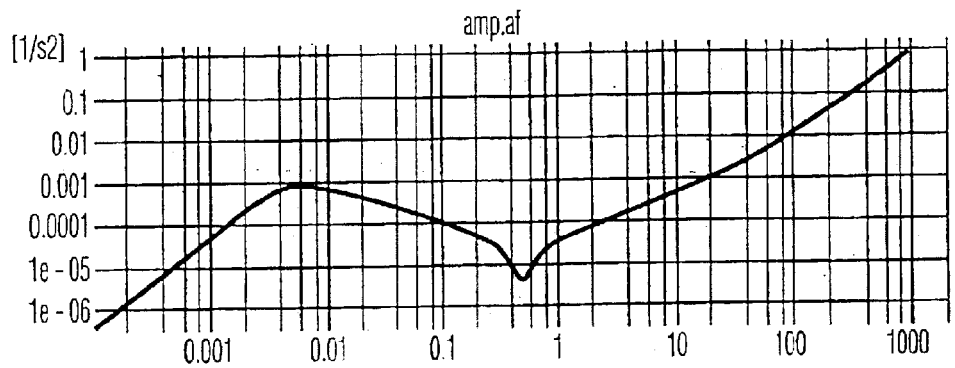
FIGS. 7A–B are diagrams that illustrate the sensitivity to floor vibrations.
Figure 7B:
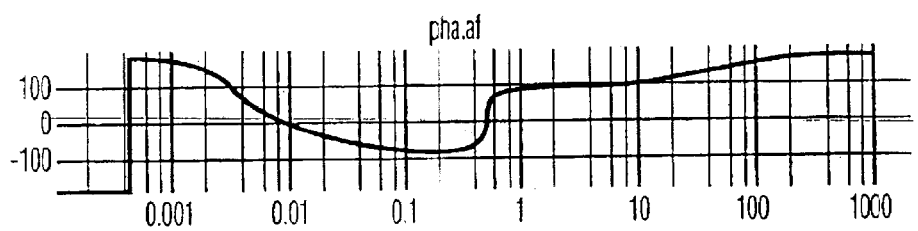

FIG. 7 shows a diagram that illustrates the sensitivity to floor vibrations. FIG. 7 shows that over a broad frequency range, the attenuation is a number of orders of magnitude better than the traditional approach.

Figure 8:
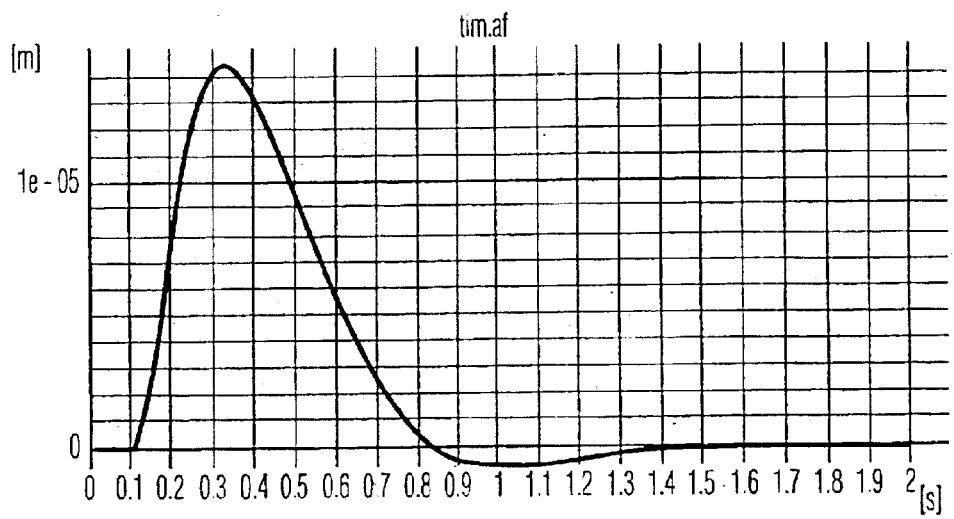
FIG. 8 is a diagram that shows a traditional system's response to a 1 [N] pulse.
Figure 9:
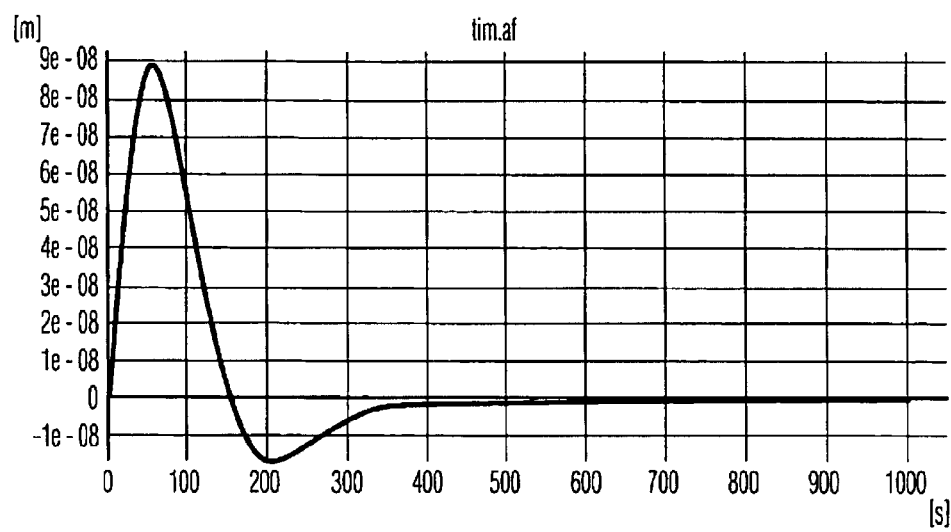
FIG. 9 is a diagram that shows an improved system's response to a 1 [N] pulse.

Due to the low frequent activities of the new approach, it will exhibit a significant longer settling behavior than we find in the traditional approach. In FIG. 8 we find the traditional response to a 1 [N] pulse of 0.1 [s] length given at 0.1 [s] after start of simulation. In FIG. 9 the same for the new system.

The response of the active system has roughly a 1500 times lower amplitude, and a 300 times longer time scale. Both these numbers are beneficial for the low acceleration level that we wanted, but there is reason for concern on how long it takes to start the system after a power down. A similar concern is how the system responds to a disturbance of the reference mass. To investigate this also a (huge) 1 [N], 0.1 [s] pulse is administered to the reference mass in FIG. 10. Because the system is set up to follow the reference aggressively, a significant main plate response results. In reality these huge forces are never injected into the reference mass, but it is important to understand, that once the reference starts to move (for instance due to the wake-up shock), it will continue to vibrate for a long time.

Figure 10:
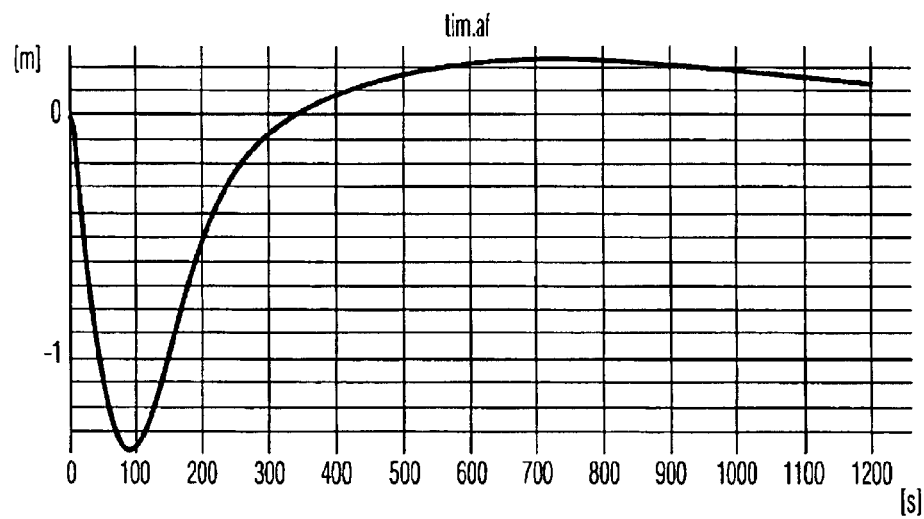
FIG. 10 is a diagram that shows how long it takes to start an improved system after a power down.
Figure 11:
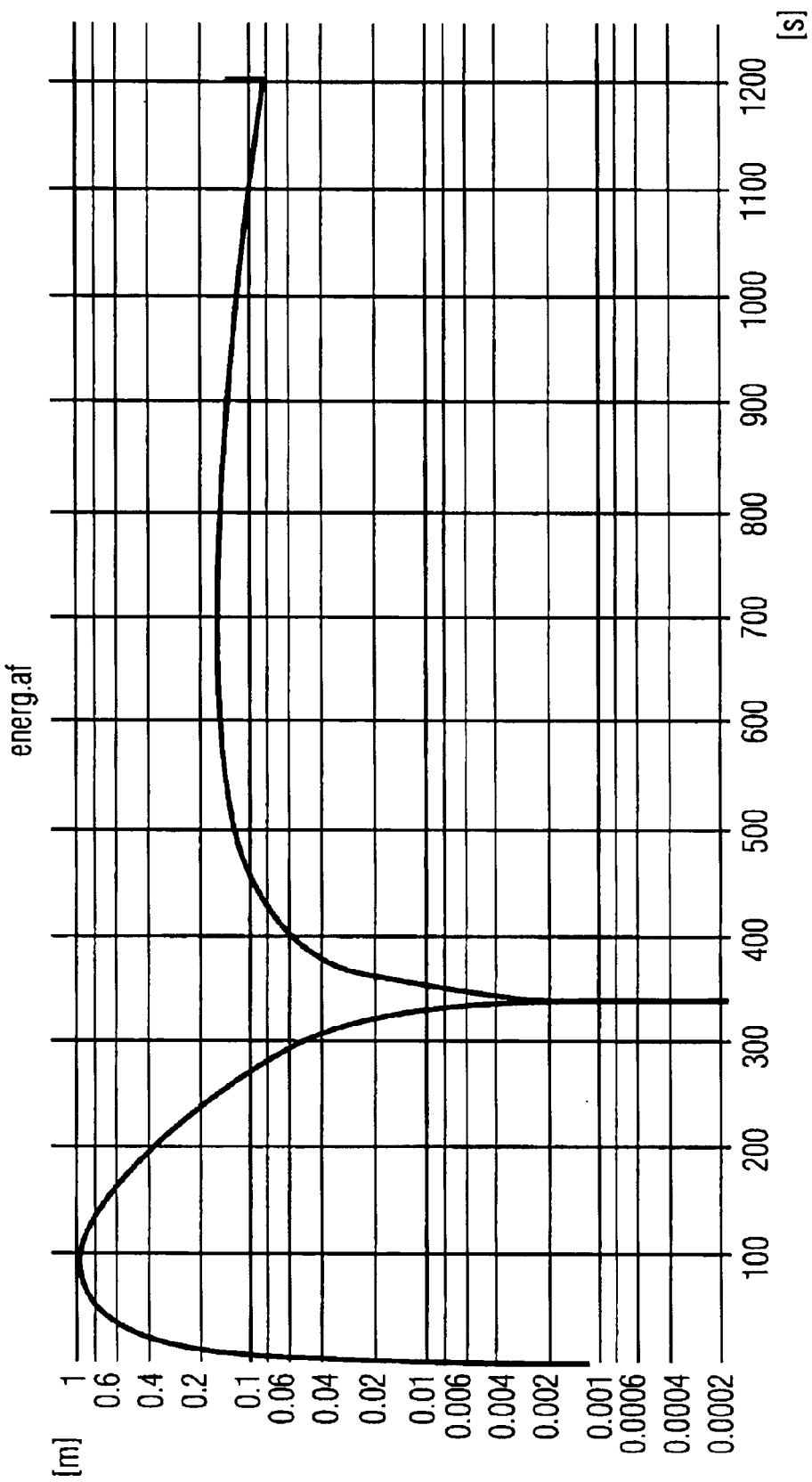
FIG. 11 is a presentation of a sum of potential and energy kinetic energy as an equivalent corresponding distance.

In FIG. 10, we see the slowly dying signal of the movements of the reference mass. We can try to find an expression that measures the speed of dying. This can be obtained through energy analysis. The residual vibrations can be modeled as a mass, damper and spring system. Then, given those parameters, we can compute the sum of potential energy ($0.5 \, k \, x^2$) and kinetic energy ($0.5 \, m \, v^2$). This sum is presented as an equivalent corresponding distance ($\sqrt{(0.5 \, x^2 + 0.5 \, m \, v^2/k)}$). This distance is shown in FIG. 11. We see that at the end of 1200 seconds, there is still a substantial distance to travel (0.1 [m]) before we are at rest. In addition, the rate of decline is slow.

Figure 12A:
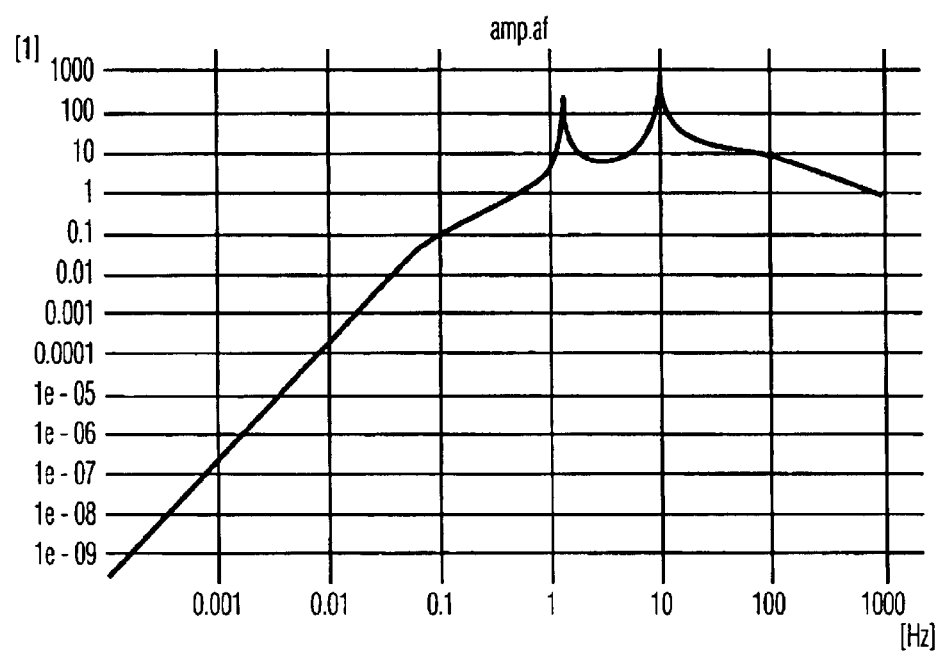
FIGS. 12A–C show an improvement of the system in a mid frequency range by using differentiating filter.
Figure 12B:
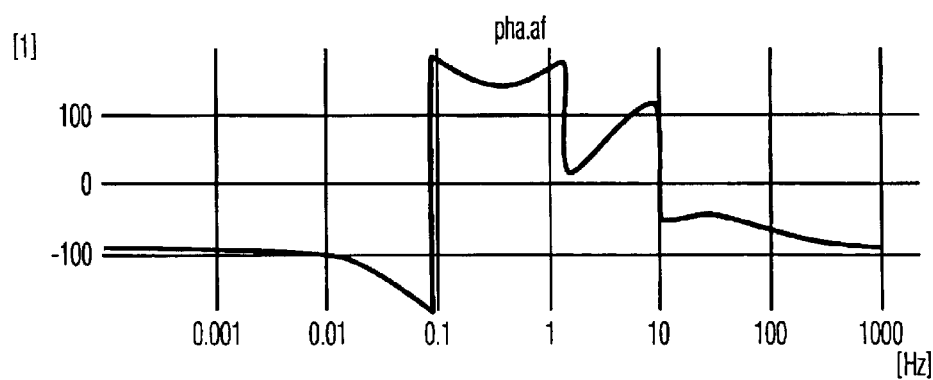
Figure 12C:
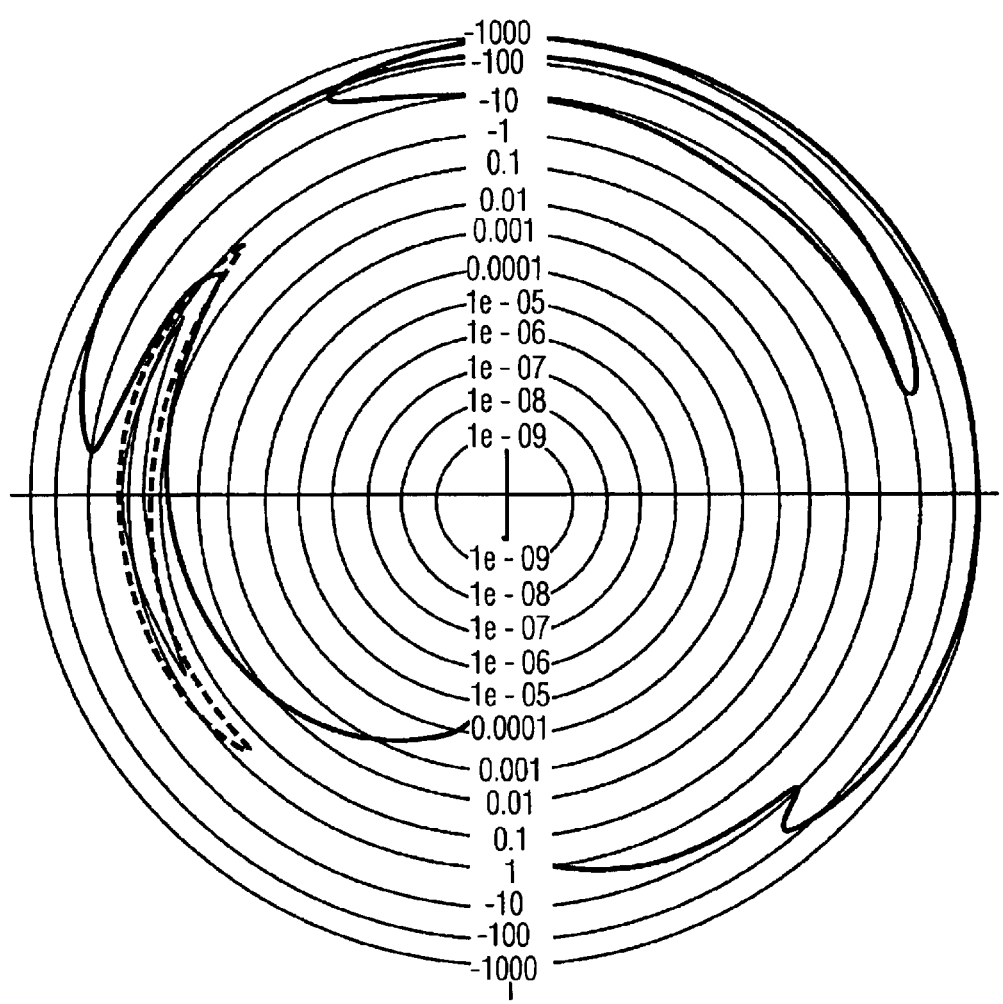

Since the status of the reference mass must be assumed to be unknown at startup, the above slow approach to tranquility is a disadvantage. Changes in the controller can improve this behavior. First of all, the resonance frequency of the reference mass is moved up to 10 [Hz]. This will shift most of the suppression to the higher frequencies. As a result there will be less performance at the lower frequencies, which will improve the low frequency recovery. In combination to the increase of stiffness, the overall gain is also reduced. This aims to maintain the high frequent suppression while lowering the low frequent suppression. As a third measure, the distance of the open loop curve to the –1 point is increased. This increase will introduce more damping in the closed loop response. In order to improve the mid frequency range, a differentiating filter is placed at 5 [Hz] and an integrating filter at 50 [Hz]. See FIG. 12.

Figure 13A:
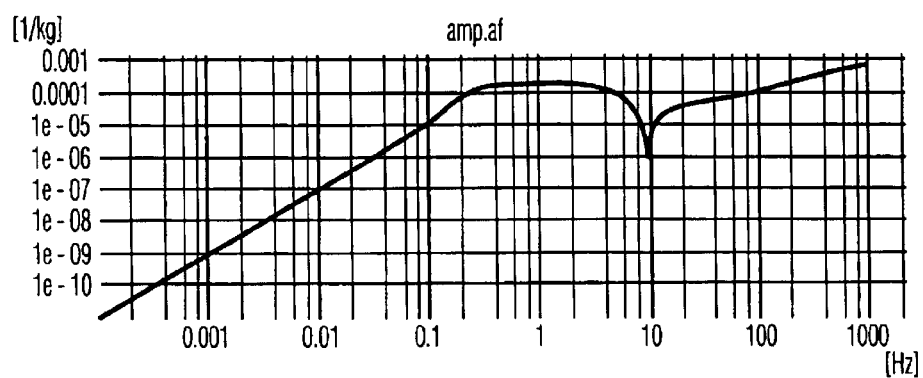
FIGS. 13A–B show a closed loop system response to forces on the main plate of an improved system.
Figure 13B:
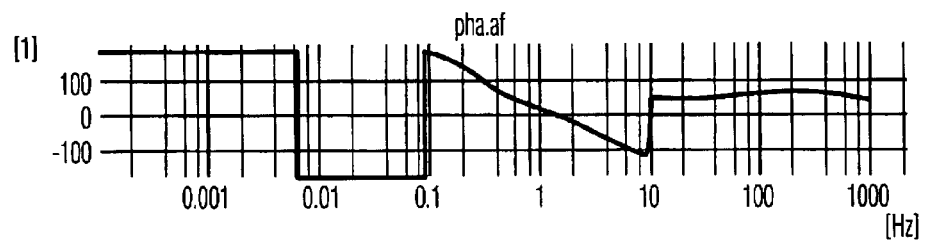
Figure 14A:
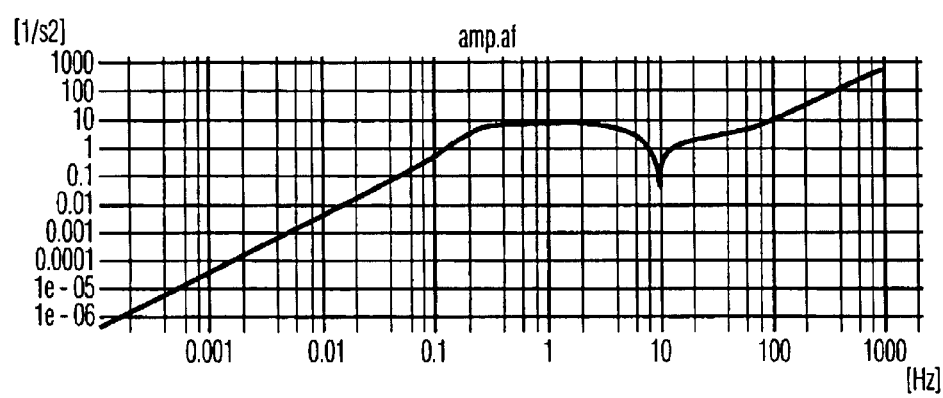
FIGS. 14A–B show responses of floor vibrations of an improved system.
Figure 14B:
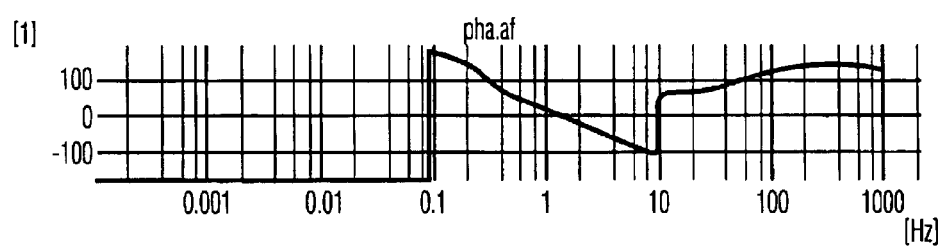

In FIG. 13 we find the closed loop system response to forces on the main plate, FIG. 14 has the responses of floor vibrations.

Figure 15:
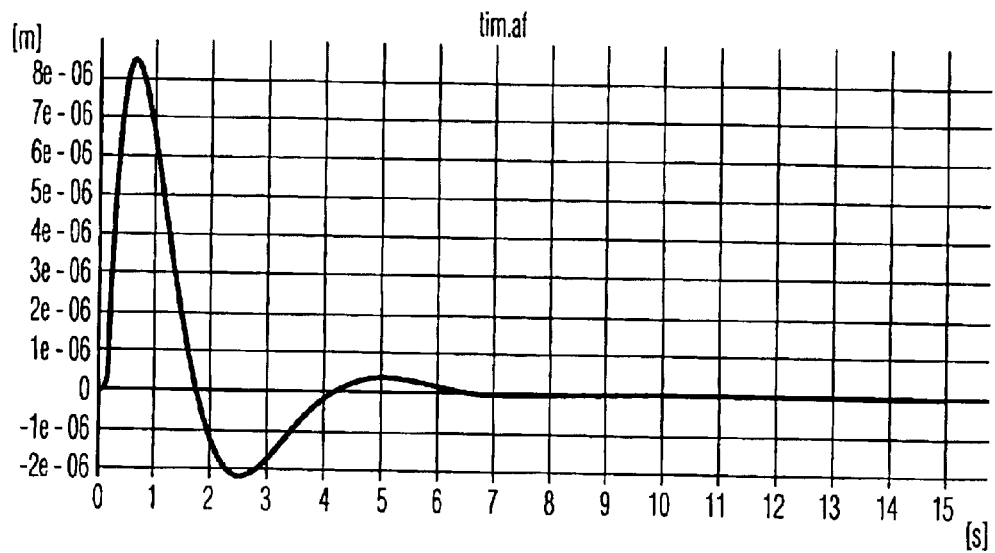
FIG. 15 shows a time response for a pulse on the main plate of an improved system.
Figure 16:
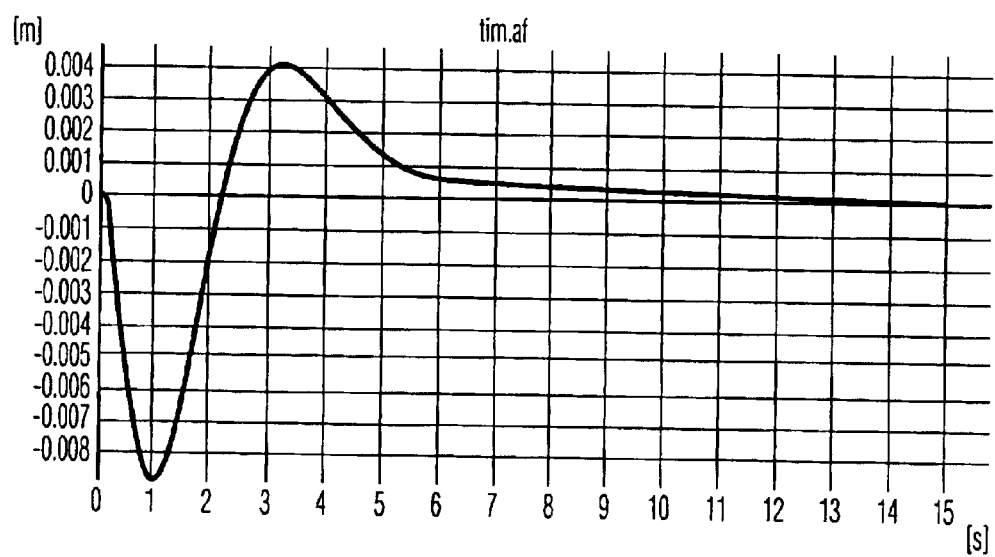
FIG. 16 shows a main plate's response of a pulse on the reference mass of an improved system.

The performance of the above systems is more modest, but still (in the range from 1 to 100 [Hz]) a factor of 10 better than the passive system. From 8 to 16 Hz, a 10 micron floor vibration will result in less than 0.01 [mm/s2] main plate vibration. At 1 [Hz], the worst spot, it is still a good 0.1 [mm/s2]. This is 5 times better than the passive approach. In FIG. 15 the time response is shown for a pulse on the main plate. Compared with the passive system, the suppression is 15 times better, and the settling time, 6 seconds, is 4 times longer, with 1.5 more periods. Combined, this is a reduction of the acceleration of $14*(4/1.5)^2=100$ times!

in FIG. 16, the main plate's response of a pulse on the reference mass is given. Also here the response time seems reasonable. The reason why the behavior is better can in part be explained by FIG. 17.

Figure 17A:
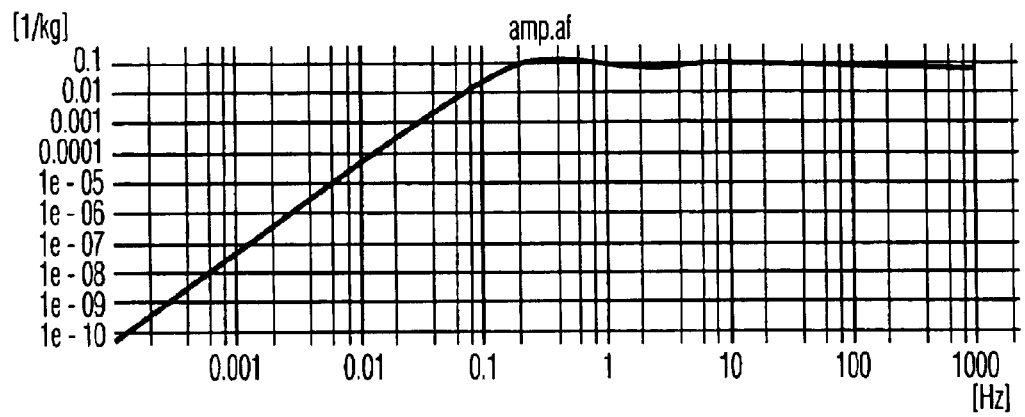
FIGS. 17A–B show a frequency repsonse function of the motion of the main plante caused by forces on the reference mass of an improved system.
Figure 17B:
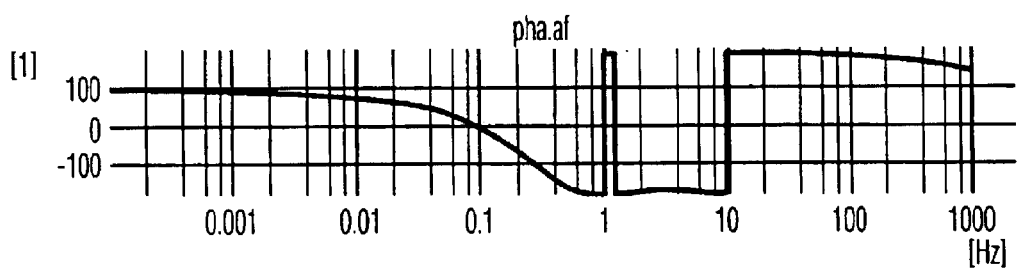

FIG. 17 is the frequency response function of the motion of the main plate caused by forces on the reference mass. We see a straight line from 0.2 [Hz] onwards, indicating that above this frequency, the main plate is well slaved to the reference mass line (1/10 [kg] with a −180 degrees phase shift from the force to displacement). Near 0.2 [Hz] we see hardly any peaking, the system is well damped. Under 0.2 [Hz], the system shows a +3 slope. This means that the system is rapidly insensitive for frequencies that are lower than 0.2 [Hz]. Below 0.2 [Hz], the reference mass communicates to the floor reference. This means that, depending on the amount of damping, we should expect to wait 5 seconds or settling. With little damping this could easily become 50 seconds, but in our system we have constructed sufficient damping to have 90% of the energy gone after the first 5 seconds. After 5 seconds, we see no more vibration, but an exponential decay, indicating that our system is not a simple second order system, is a collection of different parts, each with its own damped behavior.

Figure 18:
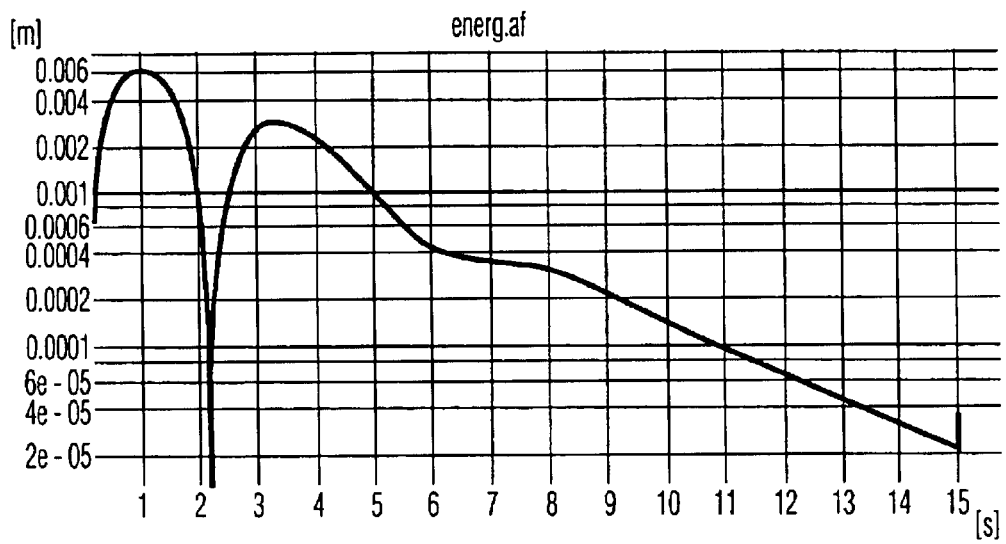
FIG. 18 shows a decay rate of the energy of the graph in FIG. 16.

We can also look at the decay rate of the energy of the graph in FIG. 16. This is given by FIG. 18. We see that, from 9 [s] to 15 [s], the residue distance reduces in a straight line from 2e-4 to 2e-5 [m]. So every 6 seconds the vibration level is reduced by a factor of 10. That is sufficiently quick for most power up sequences.

The air mount proposed is substantially better than the passive air mounts. The performance is a compromise between power up speeds and damping performance. An implemented design, with a 10 [Hz] reference support and relative high frequent filters (near 0.5 [Hz], instead of 0.002 [Hz]) and without any integrator seems to provide good results for an air mount. The invention enables an even better result. Certain control options can be more optimized. There is also a possibility to use the last controller during start-up, and then once the system is stable and quiet, to switch over to a high performance controller. This is expected to provide better results.

The stiffness of the passive system between the main plate and the floor does not play a significant role any more and can be relaxed. The damper can be taken out completely. On the performance graphs we see nothing change near the 2 [Hz] air mount resonance. Having the damper out reduces the transmission from floor vibrations into the main plate. Changing the stiffness will not affect the force sensitivity, but it will affect the floor transmissibility.

The mass of the reference is not important, but the resonance frequency is because it determines where most of the improvement will be.

The lower the mechanical damping of the reference, the more mobile it is and the more sensor signal is generated. This is why, in FIGS. 6 and 7, there is a dip at 0.5 [Hz].

The application specific tuning that is foreseen is the tuning of the mass and stiffness of the payload (rigid body mode) and the tuning of the feed forward signals. Removing the cross talk between the dampers is an identical procedure as tuning the feed forward.

Figure 19:
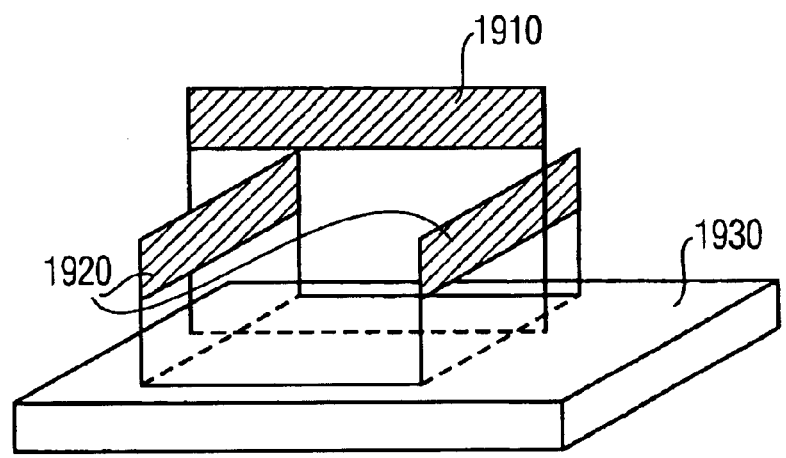
FIG. 19 shows a damper of the invention with an actuator placed perpendicular to a sensor.

FIG. 19 shows a diagram of a damper comprising an actuator coil 1910 placed perpendicular to a pair of sensor coils 1920. The actuator 1910 and the sensors 1920 are connected an object to be damped 1930. By placing the actuator 1910 and the sensors 1920 perpendicular to each other, unwanted cross talk is minimized (e.g., EM cross talk in case the sensor and the actuator are both of a Lorenz type of coil) since the vectors of the EM-fields of the sensor and actuator coils are 90 degrees from each and therefore they can not see each other's EM-field.

Figure 20:
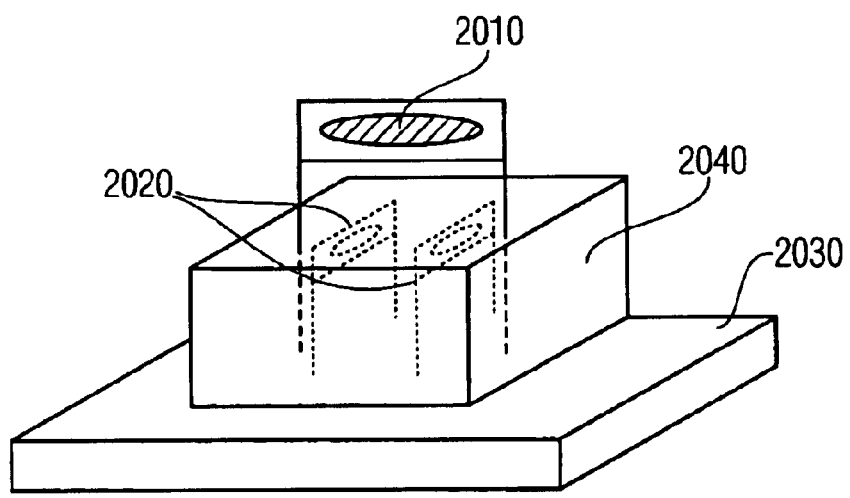
FIG. 20 shows a damper of the invention with an actuator placed perpendicular to a sensor whereby magnetical shielding has been applied.

FIG. 20 shows a diagram similar to that of FIG. 19 but now an additional magnetical cross talk countermeasure has been applied. FIG. 20 comprises of a damper comprising an actuator 2010 placed perpendicular to a pair of sensors 2020, an object to be damped 2030 and a magnetical shielding 2040. The magnetical shielding comprises a material of $\mu$-metal and is typically placed around the sensor coils that are part of sensors 2020. This magnetical shield can also have a conductive layer to minimize the EM crosstalk from the actuator or from the environment. This shield can also be given mass and stiffness to attenuate any acoustical disturbance from the environment.

Figure 21:
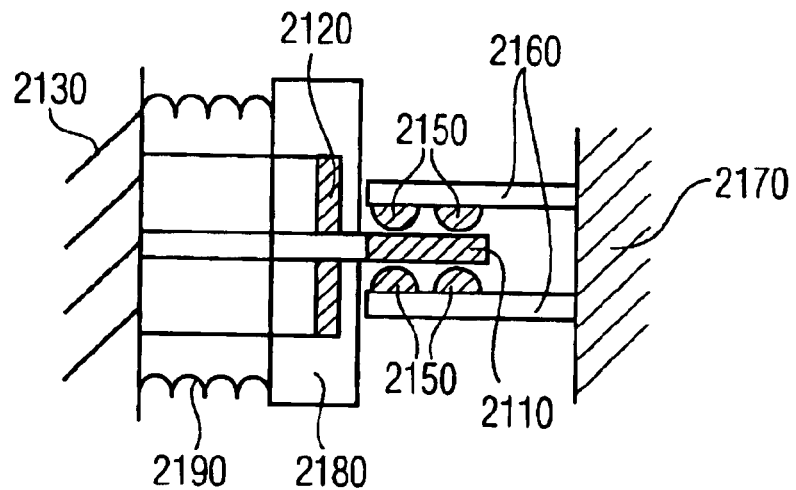
FIG. 21 shows an absolute damper of the invention with a floating mass.

FIG. 21 shows an absolute damper of the invention with a floating reference mass. FIG. 21 comprises an actuator-coil 2110, an actuator-magnet 2150 mounted on arms 2160 that are connected to floor 2170, an object to be damped 2130 on which sensor-coil 2120 is mounted and on which magnet assembly 2180 that is connected by springs 2190. Magnet assembly 2180 comprises a reference mass and a sensor-magnet. Magnet assembly 2180 may also comprise a magnetical as well as an electrical shielding that shield the sensor (comprising coil 2120 and the sensor-magnet) from the actuator (comprising actuator coil 2110 and the actuator-magnet 2150) and from other external electrical or magnetical disturbances.

Figure 22:
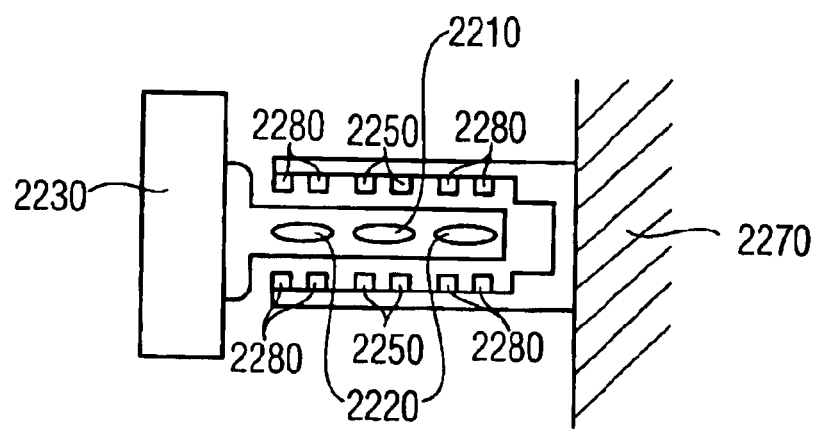
FIG. 22 shows a schematic diagram of an active damper

FIG. 22 shows a schematic diagram of an active damper. FIG. 22 comprises a sensor coil 2220, an actuator-coil 2210, a sensor magnet 2280, an actuator-magnet 2250, and an object to be damped 2230. Magnets 2250 are mounted to the floor 2270. Magnets 2280 are mounted to a reference mass. Coils 2250 and 2220 are mounted in a stiff manner to an object to be damped 2230. Sensor coil 2210 produces an electrical signal I-s upon movement relative to sensor magnet 2280. In this example of the active damper, an electrical controller comprises a low-pass filter amplifier and a high-pass filter amplifier to which signal I-s is fed. Many other types of electrical controllers exist and can be applied for the invention. The outputs of the amplifiers are added and result in electrical signal I-a. Amplification and filter parameters can be adjusted and dimensioned according to parameters of a system of which the active damper is a part. Electrical signal I-a will induce a movement of actuator coil 2210 relative to actuator magnet 2250. The active damper is only then properly adjusted and dimensioned when it can isolate a vibration and cancel the vibration in a desired frequency range with a desired damping characteristic. Although the damper shown in FIG. 22 is of a relative type most of the electrical controller can be used for an absolute damper as well.

What is claimed is:

1. A damper system, comprising:
   a sensor that can measure a mechanical vibration and is capable of producing an electrical signal caused by the vibration and wherein the sensor is designed to be mounted between a body and a reference mass;
   an actuator responsive to the electrical signal thereby producing a force between the body and an external body;

wherein the sensor and the actuator are located substantially close to each other thereby having a substantially small delay; wherein
the delay substantially consists of the sum of an acoustic signal delay and an electronic signal delay in the actuator and the sensor.

2. The system of claim 1, wherein the sensor comprises a Lorenz type coil with magnet pair and the actuator comprises a Lorenz type of coil with magnet pair.

3. The system of claim 1, wherein a line of action of the sensor coincides with a line of action of the actuator.

4. The system of claim 1, further comprising:
an acoustical shielding placed such that acoustical airwaves are substantially attenuated before reaching the reference mass of the sensor.

5. The system of claim 2, wherein the coils are placed such that their induced magnetic fields are substantially perpendicular.

6. The system of claim 2, wherein multiple sensor coils are positioned such that a magnetical field disturbance originating from at least one of the actuator coil and an external source is substantially cancelled by one of subtraction and addition of the sensor signal.

7. The system of claim 2, further comprising:
a magnetical shielding placed such that an EM field induced by the actuator is substantially attenuated.

8. The system of claim 2, further comprising:
a electrical shielding placed such that an EM field induced by the actuator is substantially attenuated.

9. The system of claim 1, wherein the delay is less than about 1 millisecond.

10. The system of claim 1, wherein the delay is less than about 500 microseconds.

11. The system of claim 1, wherein the delay is less than about 50 microseconds.

12. An apparatus, comprising:
an active vibration isolation and cancellation absolute damper mounted between a body to be damped and one of a floor and another body that acts as receiver for the reaction forces, comprising:
a sensor that can measure a mechanical vibration and is capable of producing an electrical signal caused by the vibration and wherein the sensor is designed to be mounted between the apparatus and an external mass; and
an actuator responsive to the electrical signal thereby producing a force between the body and one of the floor and the other body that acts as a receiver for reaction forces;
wherein the sensor and the actuator are located substantially close to each other thereby having a substantially small acoustic delay between the actuator and the sensor; wherein the delay substantially consists of the sum of an acoustic signal delay and an electronic signal delay in the actuator and the sensor.

13. The apparatus of claim 12, wherein the sensor comprises a Lorenz type coil and the actuator comprises a Lorenz type of coil.

14. The apparatus of claim 12, wherein a line of action of the sensor coincides with a line of action of the actuator.

15. The apparatus of claim 12, further comprising:
an acoustical shielding placed such that an acoustical airwave is substantially attenuated before reaching the sensor.

16. The apparatus of claim 13, whereby the coils are placed such that their induced magnetic fields are substantially perpendicular.

17. The apparatus of claim 13, further comprising:
a magnetical shielding placed such that an EM field induced by the actuator is substantially attenuated.

18. The apparatus of claim 13, further comprising:
a electrical shielding placed such that an EM field induced by the actuator is substantially attenuated.

19. The apparatus of claim 12, wherein the delay is less than about 1 millisecond.

20. The apparatus of claim 12, wherein the delay is less than about 500 microseconds.

21. The apparatus of claim 12, wherein the delay is less than about 50 microseconds.

22. A method of actively damping a body from vibration, the method comprising:
measuring a mechanical vibration with a sensor;
producing an electrical signal caused by the vibration and wherein the sensor or is designed to be mounted between the body and a reference mass;
using an actuator for responding to the electrical signal thereby producing a force between the body and an external body; and
using the sensor and the actuator, placed substantially close to each other thereby having a substantially small delay; wherein the delay substantially consists of the sum of an acoustic signal delay and an electronic signal delay in the actuator and the sensor.

23. The method of claim 22, wherein the delay is less than about 1 millisecond.

24. The method of claim 22, wherein the delay is less than about 500 microseconds.

25. The method of claim 22, wherein the delay is less than about 50 microseconds.

26. The method of claim 22, wherein the sensor comprises a Lorenz type coil with magnet pair and the actuator comprises a Lorenz type of coil with magnet pair.

27. The method of claim 22, wherein a line of action of the sensor coincides with a line of action of the actuator.

28. The method of claim 26, wherein the coils are placed such that their induced magnetic fields are substantially perpendicular.

29. The method of claim 26, wherein multiple sensor coils are positioned such that a magnetical field disturbance originating from at least one of the actuator coil and an external source is substantially cancelled by one of subtraction and addition of the sensor signal.

30. A system for control of a movement of a body relative to a reference, wherein the system comprises:
a sensor for supplying a sensor signal representative of the movement;
an actuator for affecting the movement under control of the sensor signal;
sensor and the actuator are arranged so close to one another that a delay time characterizing the control of the movement is smaller than 1 millisecond and depends substantially only on an acoustic coupling between the sensor and the actuator.

31. The system of claim 30, wherein the delay time is less than 500 microseconds.

32. The system of claim 30, wherein the delay time is less than 50 microseconds.

33. The system of claim 30, for use in a manufacturing of integrated circuitry.

34. The system of claim 30, for damping the movement.

35. The system of claim 30, wherein the sensor comprises a Lorenz type coil with magnet pair and the actuator comprises a Lorenz type of coil with magnet pair.

36. The system of claim 35, wherein the coils are placed such that their induced magnetic fields are substantial perpendicular.

37. The system of claim 35, wherein multiple sensor coils are positioned such that a magnetical field disturbance originating from at least one of the actuator coil and an external source is substantially cancelled by one of subtraction and addition of the sensor signal.

38. The system of claim 30, wherein a line of action of the sensor coincides with a line of action of the actuator.

* * * * *